Patented June 13, 1939

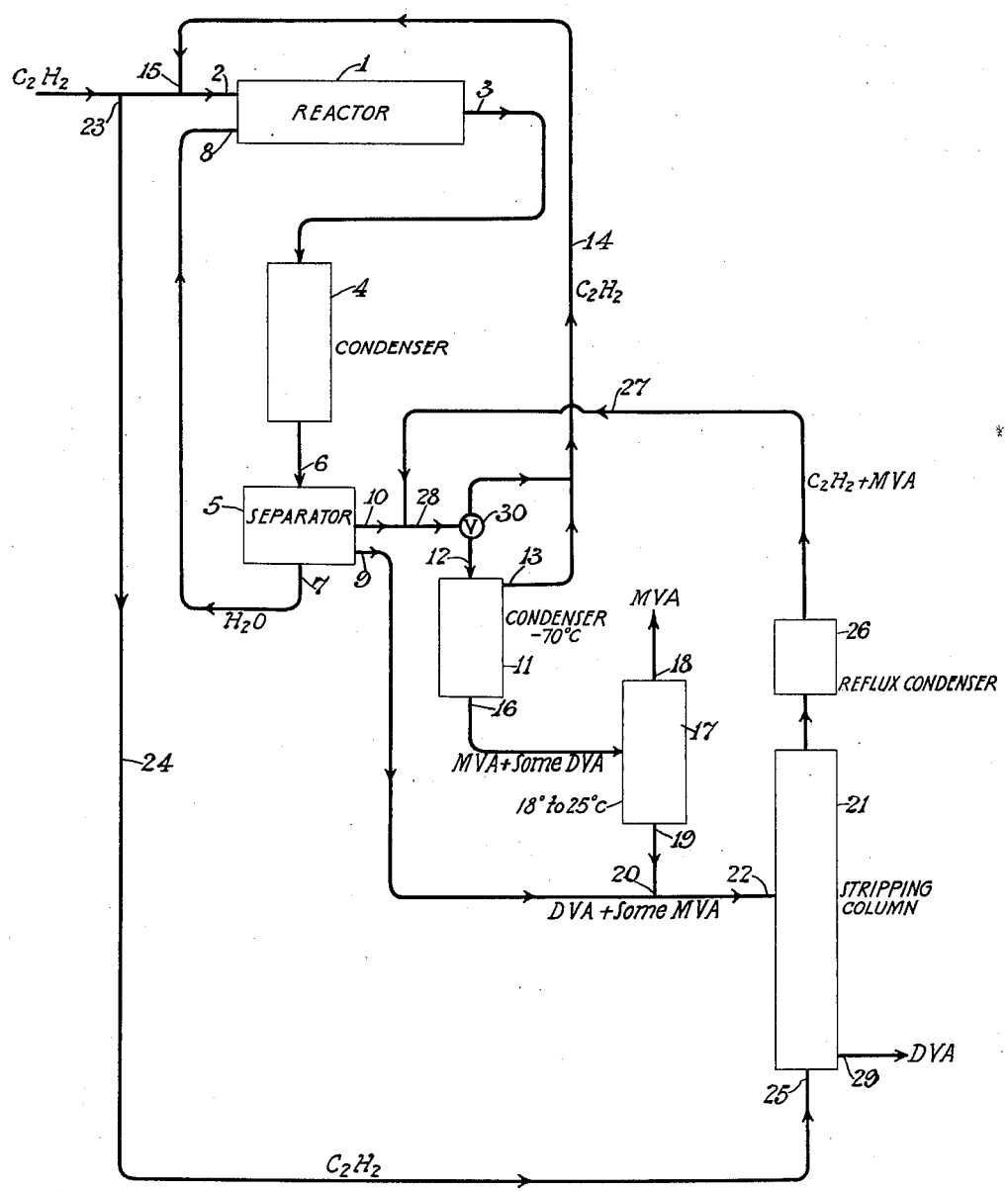

2,161,797

UNITED STATES PATENT OFFICE 2,161,797

CHEMICAL PROCESS

Albert S. Carter, Wilmington, Del., assignor to E. I. du Pont de Nemours & Company, Wilmington, Del., a corporation of Delaware Application October 15, 1937, Serial No. 169,169

14 Claims. (Cl. 260—678)

This invention relates to the manufacture of vinylacetylenes. More particularly it relates to a method for the separation of monovinylacetylene and divinylacetylene.

In the manufacture of vinylacetylenes by the catalytic polymerization of acetylene, the principal products are monovinylacetylene and divinylacetylene. In the past, thermal distillation has been used to separate these products but this method has proved unsatisfactory in some respects because it results in the formation of polymers of divinylacetylene and the deposit of gummy and hard solids in the apparatus. This necessitates frequent dismantling and costly cleaning of the equipment and also results in the loss of divinylacetylene as gummy and hard polymers thereof.

An object of this invention is the separation of monovinylacetylene and divinylacetylene. A further object is a continuous process for separating monovinylacetylene and divinylacetylene without the loss of divinylacetylene as polymer. A still further object is the efficient recovery of monovinylacetylene from solution in by-product divinylacetylene.

These objects have been accomplished by passing gaseous acetylene through a liquid mixture of monovinylacetylene and divinylacetylene in such manner that the acetylene entrains and removes monovinylacetylene from the mixture. The separation of monovinylacetylene and divinylacetylene in this manner may be carried out at a temperature below that at which the polymerization of divinylacetylene occurs in substantial amount.

The polymerization of acetylene may be carried out under conditions which give a high yield of monovinylacetylene or it may be carried out under conditions which give a high yield of divinylacetylene. The separating steps of this invention may be used under either set of conditions, and where the separation is carried out as a continuous process along with the polymerization of acetylene, the gases effluent from the stripping step may be returned to the system at a suitable point as will be more fully set forth hereinafter.

The single figure of the drawing is a flow sheet of the process herein described.

As shown on the drawing, acetylene is passed into reactor 1 at 2. This reactor preferably contains a catalyst such, for example, as an aqueous solution of cuprous chloride and ammonium chloride. The temperature of the reactor is preferably between 45° and 100° C. at atmospheric pressure. The rate of flow of acetylene and the other reaction conditions are adjusted to give a maximum yield of the desired product. Since, at the present time, monovinylacetylene is the product of the greatest commercial importance, the separation process will be described first with reactor conditions adjusted to favor high yields of monovinylacetylene. The vent gases leaving the reactor or polymerization zone at 3 comprise monovinylacetylene, divinylacetylene, small amounts of other acetylene polymers, unreacted acetylene and water vapor from the catalyst. These gases are cooled to 0° C. in condenser 4 and passed into separator 5 at 6. Water is condensed, forms the bottom layer in the separator 5 which it leaves at 7 and is returned to reactor 1 at 8. A second liquid layer rich in divinylacetylene is formed in the separator, is drawn off at 9 and passes directly to stripping column 21. A mixture of gaseous monovinylacetylene and acetylene leaves separator 5 at 10 and passes into —65° to —75° C. condenser 11 at 12. Acetylene is vented from condenser 11 at 13, passes through conduit 14 and is returned to the acetylene supply at 15. The separation of monovinylacetylene and divinylacetylene at 5 is a crude one and the liquid monovinylacetylene leaving condenser 11 at 16, still containing some divinylacetylene, passes into column 17 which is held at a temperature of between 18° and 25° C. Practically pure monovinylacetylene (abbreviated MVA in the drawing) is vaporized and vented at 18. The residue comprising a mixture of monovinylacetylene and divinylacetylene leaves column 17 at 19, and at 20 is added to the crude divinylacetylene which leaves separator 5 at 9. The crude divinylacetylene containing a residual amount of monovinylacetylene enters stripping column 21 at 22, about midway up the column. Acetylene taken from the supply at 23 is passed through conduit 24 into the bottom of column 21 at 25. As the crude divinylacetylene passes downward through the stripping column and the acetylene rises upward through the column in counter-current flow, monovinylacetylene is entrained and the gases are vented at the top. The vent gases pass through reflux condenser 26 to return any entrained divinylacetylene to the stripping column. The mixture of acetylene and monovinylacetylene from the reflux condenser are returned through conduit 27 to the system at 28, a point prior to the separation of acetylene and monovinylacetylene. Divinylacetylene (abbreviated DVA in the drawing) substantially free of (i. e., containing less than 1%) monovinylacetylene leaves stripping column 21 at 29. It is obvious that the acetylene and monovinylacetylene from the reflux condenser may be returned to the system at any point between 3, where the products leave reactor 1, and 12 where the mixture of acetylene and crude monovinylacetylene enters column 11. Likewise, the acetylene for stripping may be obtained from the supply (as shown at 23), it may be taken from the supply after the unreacted acetylene has been returned (as between 2 and 15), it may be tapped off the unreacted acetylene return conduit 14, or it may be from any other suitable source, such as a separate generator. By returning the vent gases to the system, all of the monovinylacetylene is eventually recovered at 18 and the acetylene used in stripping is eventually polymerized in reactor 1.

Where the yield of divinylacetylene from reactor 1 is very low, the second liquid layer in separator 5 may fail to appear. The divinylacetylene then leaves the separator 5 at 10 with the monovinylacetylene and passes through condenser 11 and column 17 and thence to the stripping column. In this case, the conduit between 9 and 20 may be closed, as by a valve.

Where the reactor conditions are adjusted to produce divinylacetylene in high yield, the vent gases of reactor 1 pass through condenser 3 and separator 5 as before. Acetylene and monovinylacetylene leave separator 5 at 10 and pass to valve 30 which is now so adjusted that the gases do not enter condenser 11 and column 17 but are returned through conduit 14 to reactor 1 at 2. The crude divinylacetylene leaves separator 5 at 9 as before and passes to stripping column 21. Acetylene is introduced at the bottom of column 21 at 25, entrains the monovinylacetylene, passes through reflux condenser 26 and is returned to the mixture of acetylene and monovinylacetylene at 28. It is clear that when this process is carried out in this manner the vent gases from column 21 may be returned to the system at any point which will permit their recirculation to reactor 1 and which will not permit their recirculation to stripping column 21.

It will be understood that the flow sheet is diagrammatic and that no attempt has been made to give details of the apparatus which are unnecessary to the understanding of the invention. In order that the invention may be more fully disclosed, the following specific examples are given. These examples are merely illustrative and the invention is not limited thereto as will be more fully apparent hereinafter.

Example I

The process of this example, which illustrates the method of separating monovinylacetylene and divinylacetylene by stripping with acetylene, was carried out in a flooded column in which it was possible to get an accurate measure of contact between the acetylene and the mixture of divinylacetylene and monovinylacetylene during a unit time. This method is not the preferred manner of carrying out the operation on a large scale, nor is it the most efficient, but it serves to illustrate the process.

A column 3 cm. in diameter and 50 cm. long was packed with fine carborundum and jacketed over two-thirds of its length with a thermostatically controlled bath held at 25° C.; the top of this column was equipped with a dephlegmator held at approximately −35° C. and the bottom was provided with an acetylene inlet. 110 gms. of a mixture containing 15% monovinylacetylene in pure divinylacetylene was introduced in the column and acetylene was blown through at the rate of 0.22 cu. ft. per hour. The liquid in the tube was sampled hourly and the disappearance of vinylacetylene noted with respect to the acetyllene used. The results are tabulated in Table I.

Table I

| Elapsed time | Total $C_2H_2$ used | Per cent MVA in solution |
|---|---|---|
| | Cu ft. | |
| 0 | 0 | 15.0 |
| 54 minutes | 0.2 | 5.1 |
| 126 minutes | 0.4 | 4.6 |
| 168 minutes | 0.6 | 2.3 |
| 237 minutes | 1.0 | 1.8 |
| 320 minutes | 1.5 | 0.4 |

Example II

On a large scale, a method similar to that of Example I, which was carried out using a column five feet long and six inches in diameter, arranged with jacket and dephlegmator, but in this case the divinylacetylene solution was introduced at the top and slowly run through holding the lower quarter of the column flooded. During this run, the temperature of the stripping column was held at 15° C. 400 pounds of a mixture of divinylacetylene and monovinylacetylene containing 12% of monovinylacetylene was passed though the column during a period of 9 hours. During the same period, 1000 cu ft. of acetylene passed through the column in counter-current flow. The discharged divinylacetylene was substantially free (less than 1%) of monovinylacetylene.

Example III

This example illustrates one method of carrying out the process on a commercial scale.

A column was constructed of iron 12 feet long and 8 inches in diameter, equipped with a brine cooled dephlegmator at the top. A water jacket covered the lowest two feet of the column. The column, which was packed with porcelain rings, was also equipped with a divinylacetylene inlet at about 6 feet from the bottom, i. e., at about the middle of the column. A gas outlet was placed at the top of the column, a gas inlet was placed at the bottom, a liquid discharge line was also placed at the bottom and two sight-glasses were located one foot and one foot six inches, respectively, from the bottom of the column. A heating coil was located between these two sight-glasses in such manner that the liquid level in the column could be maintained over the coil by inspection through the glass. The jacket and coil were heated by means of water at 75° C. which maintained a temperature of about 45° C. in the column.

Operating this column in conjunction with the process of making monovinylacetylene as outlined in the flow sheet and as more fully described in U. S. Patent No. 2,048,838, there was fed to the stripping column a crude divinylacetylene having a composition of about 10% monovinylacetylene and 90% of a mixture of divinylacetylene, butadienylacetylene and octatrienyne, the divinylacetylene being the primary constituent of the mixture. During operation, about 57 lbs. per hour was fed to the stripping column, the liquid feed being at a temperature of approximately 45° C. and the interior of the stripping column being maintained at about this temperature.

Acetylene was fed up through the column at a rate of about 25 lbs. per hour, escaped through the dephlegmator and returned to the monovinylacetylene system as shown in the flow sheet, carrying with it the entrained monovinylacetylene. The flow into and out of the stripping column was maintained at such a rate that the liquid level in the stripping column was above the heating coil at all times. The maintenance of this condition was aided by inspection through the sight-glasses. An analysis of the divinylacetylene discharge from the bottom of the stripping column indicated that it was substantially free of monovinylacetylene although it still contained the higher boiling constituents originally present, i. e., butadienylacetylene and octatrienyne.

Any apparatus which will produce efficient contact between the gaseous acetylene and the crude divinylacetylene may be used as a stripping apparatus. For example, suitable stripping column may be packed with copper or glass rings, carborundum chain or other suitable material for packing similar columns. Such columns are preferably jacketed in well known manner to maintain a constant temperature. Since the vent gases are returned to the system, it is not absolutely essential that they be free of divinylacetylene and the use of reflux condenser 26 is optional. The thoroughness with which the separation of monovinylacetylene and divinylacetylene is accomplished is dependent upon the length of the column, the relative flow of gas and liquid and the nature of the packing. These can not be defined in numerical values for they are a function of the equipment used, but in any arrangement of apparatus, the length of the column, to be efficient, should be sufficient to essentially saturate the effluent acetylene with monovinylacetylene at the partial pressure of monovinylacetylene in the divinylacetylene feed. The rate of liquid flow is best adjusted to prevent flooding but should not be so slow that it is economically inefficient. Likewise, the rate of acetylene flow should not be great enough to cause material entrainment of divinylacetylene, but should be sufficient to completely carry away volatilized monovinylacetylene. While only one stripping column has been shown and described, several such columns may be used either in series or in parallel.

The process of this invention may be operated at any convenient pressure. The use of vacuum assists the process in some respects but the disadvantages generally outweigh the advantages. It is generally most convenient to carry out the gas stripping at or slightly above atmospheric pressure. The temperature of the stripping operation may be controlled within suitable limits. Since it is an object of this invention to prevent polymerization of divinylacetylene by heat during separation, it is desirable to keep the temperature as low as consistent with efficient stripping. An efficient temperature range has been found to be 40° to 50° C. The process is operative below and above these temperatures. With lower temperatures, however, the contact time between the stripping gas and the mixture of divinylacetylene and monovinylacetylene must be increased to obtain the same degree of separation. With higher temperatures, the tendency of divinylacetylene to undergo heat polymerization becomes more marked.

Specific details have not been given for the polymerization of acetylene to form monovinylacetylene and divinylacetylene since this part of the process may be carried out in any satisfactory manner; for example, in accordance with the disclosures of U. S. Patents Nos. 1,876,857 and 2,048,838. Catalysts suitable for the polymerization are disclosed in said patents and in U. S. Patent No. 1,811,959.

The essential improvement of the process of the present application resides in the separation of monovinylacetylene and divinylacetylene in such manner as to prevent loss of monovinylacetylene in by-product divinylacetylene and loss of divinylacetylene as divinylacetylene polymers. The process of making monovinylacetylene is greatly improved by the recovery of all of the monovinylacetylene by stripping by-product divinylacetylene since the recoverable yield (although not the actual yield) of monovinylacetylene is increased and hence the new process is economically important. The use of acetylene as the stripping gas and its recirculation to the system is also important since it lowers the number of components in the system, minimizes the necessary apparatus, and prevents loss of product in exhaust gas. Prior art attempts to separate monovinylacetylene from by-product divinylacetylene by thermal distillation have been unsatisfactory. Thermal distillation necessitated refluxing at 85° to 90° C. for a considerable period of time. This resulted in the formation of from 2% to 7% of divinylacetylene polymers which clogged the apparatus and necessitated frequent dismantling for cleaning purposes. Moreover, such thermal distillation was accompanied by considerable hazard to the workers. The process of the present invention on the other hand results in less than 0.5% polymerization of divinylacetylene and the use of lower temperatures gives perfect safety to the workers.

It will be understood that any variations or departures from the disclosure of the invention outlined herein which conform to the spirit thereof are intended to be embraced within the scope of the claims.

I claim:

1. The process which comprises forming monovinylacetylene and divinylacetylene by polymerizing acetylene, separating part of the monovinylacetylene from the other products, stripping substantially all of the residual monovinylacetylene from the remaining products by passing gaseous acetylene in contact therewith and passing the thereby formed mixture of acetylene and monovinylacetylene to the system at a point prior to the partial separation of monovinylacetylene from the other products.

2. The process which comprises forming monovinylacetylene and divinylacetylene by polymerizing acetylene, separating part of the monovinylacetylene from the other products, stripping substantially all of the residual monovinylacetylene from the remaining products by passing gaseous acetylene in contact therewith while maintaining the temperature of the acetylene polymers below that at which heat polymerization of divinylacetylene occurs in substantial amount and passing the thereby formed mixture of acetylene and monovinylacetylene to the system at a point prior to the partial separation of monovinylacetylene from the other products.

3. The process which comprises forming monovinylacetylene and divinylacetylene by polymerizing acetylene, effecting a crude separation of monovinylacetylene and unreacted acetylene from divinylacetylene, separating acetylene from the crude monovinylacetylene, vaporizing monovinylacetylene from the crude monovinylacetylene, adding the residue from said vaporization to the crude divinylacetylene, stripping substantially all of the residual monovinylacetylene from the crude divinylacetylene by passing gaseous acetylene in contact therewith in counter-current flow and passing the thereby formed gaseous mixture of acetylene and monovinylacetylene to the system at a point subsequent to the polymerization of acetylene and prior to the separation of acetylene from crude monovinylacetylene.

4. The process which comprises forming monovinylacetylene and divinylacetylene by polymerizing acetylene, effecting a crude separation of monovinylacetylene and unreacted acetylene from divinylacetylene, separating acetylene from the crude monovinylacetylene, vaporizing monovinylacetylene from the crude monovinylacetylene, adding the residue of the said vaporization to the crude divinylacetylene, stripping substantially all of the residual monovinylacetylene from the crude divinylacetylene by passing gaseous acetylene in contact therewith in counter-current flow while maintaining the temperature below that at which polymerization of divinylacetylene occurs in substantial amount and passing the thereby formed gaseous mixture of acetylene and monovinylacetylene to the system at a point subsequent to polymerization of acetylene and prior to the separation of acetylene from crude monovinylacetylene.

5. The process which comprises forming monovinylacetylene and divinylacetylene by polymerizing acetylene, effecting a crude separation of monovinylacetylene and unreacted acetylene from divinylacetylene, separating acetylene from the crude monovinylacetylene, returning said acetylene to the acetylene supply, vaporizing monovinylacetylene from the crude monovinylacetylene at a temperature between 18° and 25° C., adding the residue from said vaporization to the crude divinylacetylene, stripping substantially all of the residual monovinylacetylene from the crude divinylacetylene by passing gaseous acetylene in contact therewith in counter-current flow at a temperature between 40° and 50° C. and passing the thereby formed mixture of acetylene and monovinylacetylene to the system at a point subsequent to the acetylene polymerization and prior to the separation of acetylene from the crude monovinylacetylene.

6. A process which comprises forming monovinylacetylene and divinylacetylene by polymerizing acetylene, effecting a crude separation of monovinylacetylene and unreacted acetylene from divinylacetylene, returning the mixture of monovinylacetylene and unreacted acetylene to the polymerization zone, stripping substantially all of the residual monovinylacetylene from the crude divinylacetylene by passing gaseous acetylene in contact therewith in counter-current flow and passing the thereby formed gaseous mixture of acetylene and monovinylacetylene to the system at a point prior to the return of the mixture of monovinylacetylene and unreacted acetylene to the polymerization zone.

7. A process which comprises forming monovinylacetylene and divinylacetylene by polymerizing acetylene, effecting a crude separation of monovinylacetylene and unreacted acetylene from divinylacetylene, returning the mixture of monovinylacetylene and unreacted acetylene to the polymerization zone, stripping substantially all of the residual monovinylacetylene from the crude divinylacetylene by passing gaseous acetylene in contact therewith in counter-current flow while maintaining the temperature below that at which heat polymerization of divinylacetylene occurs in substantial amount and passing the thereby formed gaseous mixture of acetylene and monovinylacetylene to the system at a point prior to the return of the mixture of monovinylacetylene and unreacted acetylene to the polymerization zone.

8. The process which comprises forming monovinylacetylene and divinylacetylene by polymerizing acetylene, effecting a crude separation of monovinylacetylene and unreacted acetylene from divinylacetylene, returning the mixture of monovinylacetylene and acetylene to the polymerization zone, stripping substantially all of the residual monovinylacetylene from the crude divinylacetylene by passing gaseous acetylene in contact therewith in counter-current flow at a temperature of between 40° and 50° C. and passing the thereby formed mixture of monovinylacetylene and acetylene to the system at a point prior to the return of the mixture of monovinylacetylene and unreacted acetylene to the polymerization zone.

9. The process which comprises forming monovinylacetylene and divinylacetylene by polymerizing acetylene, separating unreacted acetylene from the polymerization products, separating part of the monovinylacetylene from the other products by vaporizing at a temperature below that at which heat polymerization of divinylacetylene occurs in substantial amount, stripping substantially all of the residual monovinylacetylene from the remaining products by passing gaseous acetylene in contact therewith in counter-current flow at a temperature below that at which heat polymerization of divinylacetylene occurs in substantial amount and adding the mixture of acetylene and monovinylacetylene thereby formed to the system at a point subsequent to the acetylene polymerization and prior to the separation of unreacted acetylene from the polymerization products.

10. The process which comprises forming monovinylacetylene and divinylacetylene by polymerizing acetylene, separating unreacted acetylene from the polymerization products, separating part of the monovinylacetylene from the other products by vaporization at a temperature between 18° and 25° C., stripping substantially all of the residual monovinylacetylene from the remaining products by contacting them with gaseous acetylene in counter-current flow at a temperature between 40° and 50° C. and adding the mixture of acetylene and monovinylacetylene to the system at a point subsequent to the acetylene polymerization and prior to the separation of unreacted acetylene from the polymerization products.

11. The process of separating monovinylacetylene and divinylacetylene which comprises removing part of the monovinylacetylene by vaporizing it from a liquid mixture of monovinylacetylene and divinylacetylene and removing substantially all of the residual monovinylacetylene from the mixture by passing it in counter-current flow in contact with gaseous acetylene.

12. In the process of separating monovinylacetylene from divinylacetylene, the step of stripping monovinylacetylene from a liquid mixture of monovinylacetylene and divinylacetylene by passing gaseous acetylene and said mixture in contact with each other.

13. In the process of separating monovinylacetylene from higher polymers of acetylene, the step of stripping monovinylacetylene from a liquid mixture of acetylene polymers by bringing said mixture and gaseous acetylene into contact with each other, entraining substantially all of the monovinylacetylene with the acetylene, and separating the gases from the liquid.

14. In the process of separating monovinylacetylene from divinylacetylene, the step of passing a liquid mixture of monovinylacetylene and divinylacetylene in contact with gaseous acetylene in counter-current flow at a temperature below that at which substantial amounts of divinylacetylene polymerize.

ALBERT S. CARTER.